US005223151A

United States Patent [19]

Rojas

[11] Patent Number: 5,223,151

[45] Date of Patent: Jun. 29, 1993

[54] DEVICE FOR THE COLLECTION AND EVALUATION OF THE EMBRYO IN THE BOVINE AND OTHER ANIMAL SPECIES

[76] Inventor: Carlos A. B. Rojas, Calle Jupiter 204, Fraccionamiento Galaxia, Villahermosa, Tabasco 2000, C.P. 86035, Mexico

[21] Appl. No.: 872,324

[22] Filed: Apr. 23, 1992

[30] Foreign Application Priority Data

Apr. 26, 1991 [MX] Mexico .................................... 25531

[51] Int. Cl.[5] ............................................. B01D 37/00

[52] U.S. Cl. .................................... 210/767; 128/897; 210/94; 210/422; 210/445; 210/460; 210/536; 604/317

[58] Field of Search ............... 210/422, 428, 445, 460, 210/485, 536, 537, 94, 767, 800; 604/55, 317, 318, 319, 320, 323, 404, 406; 128/760, 766, 897; 422/101, 102, 103, 104; 350/535, 536; 209/235, 422, 434, 445; 73/61.63, 864.51, 864.64, 863.23

[56] References Cited

U.S. PATENT DOCUMENTS 4,781,706 11/1988 Suzuki et al. ........................ 210/460
4,957,492 9/1990 McVay ................................ 128/760

*Primary Examiner*—Robert A. Dawson
*Assistant Examiner*—Sun Uk Kim
*Attorney, Agent, or Firm*—Marks & Murase

[57] ABSTRACT

A method and device for collecting and evaluating an embryo contained in a fluid medium. The fluid containing the embryo is discharged into a receptacle and sequentially drained and filtered until the remaining fluid containing the embryo is located in the proximity of a transparent flat bottom wall. The receptacle includes sloped side walls to keep the embryo from sticking to the side walls. Vertically spaced filter meshes are provided on the side walls to allow sequential filtering and draining. The fluid is discharged through a tube directed away from the filter meshes to prevent the embryo from being lodged in the filter mesh. A light projection chamber can be provided to concentrate light on the flat bottom wall.

17 Claims, 6 Drawing Sheets

DEVICE FOR THE COLLECTION AND EVALUATION OF THE EMBRYO IN THE BOVINE AND OTHER ANIMAL SPECIES

BACKGROUND OF THE INVENTION

In the last decade embryo transfer technology has been the focal point of research in the industry of farm animal production because it allows one to obtain progeny from a female with superior productive characteristics relative to the average of the breed. This results in offspring, in recipients cows, far superior to that which could be obtained from those cows under natural conditions.

The history of embryo transfer goes back to the 17th century. In 1672, Mr. Fegnier de Graff first saw and recognized the fertilized rabbit ovum in the blastocyst stage. It was not until the 19th century, however, that an offspring as a result of embryo transfer was first obtained by Mr. Walter Heape working with rabbits. In 1951 the first calf produced from a surgical transfer was reported by Mr. Willet at the University of Wisconsin.

People soon saw the commercial and productive advantages that this technique could offer. Thus, simpler methods were created and developed. In the late 1970's, the first collection and embryo transfer took place without surgery and the technology began to be applied directly by cattlemen on farms or ranches. The non-surgical methods utilized a transvaginal approach to the uterus via a series of hoses through which the medium of collection was injected until the uterus was distended. Normally, the medium was discharged through another hose into a graduated vessel, big enough to hold 1.5 liters of the medium. It was very inconvenient to search for and find, the embryos in all that medium under the microscope.

These inconveniences led to the development of filter devices. Through the use of a net filter in a small vessel it was possible to collect the embryos while letting more than 90% of the liquid pass. This collection device was introduced during the middle 1980's. It was not until later that a new device, with innovative characteristics of automatic control in the filtering and draining of the collected medium was introduced. This new device has its own system of ventilation with a device for the localization, manipulation and evaluation of the embryo. As explained below, however, these devices present great disadvantages as compared to the present invention.

The most common filter now used is a small container with a filter net and drain in the bottom of the device. The drain has an entrance that has an internal diameter smaller that the hoses of collection. This causes an increase or build up of momentary pressure that results in strong turbulence as the medium drains. This leads to formation of a foam, and the embryos adhering or sticking more tightly to the uterine mucus. This makes the job difficult for the observer trying to locate the embryos. It is also necessary in most of the cases, to wait until the foam dissolves before locating and evaluating the embryos. Another great disadvantage of this filter is, that the embryos get easily entrapped between the uterine mucus and the filtration net located at the bottom. Although this filter has a larger filtration net than that of the present invention, it has the inconvenience that the drainage tube is of a smaller diameter, which produces a strong suction that causes embryos and uterine mucus to gather at the net.

In some uterus flushes with a lot of mucus, the filtering and the draining is very slow and as a consequence this retards considerably the task of collection, and in extreme cases necessitates use of another filter. It also creates the need to control flow with a clamp that is placed on the hose connected to the draining tube. The inconvenience of this procedure is that it requires a technician or an assistant to control the outflow making sure that: the filter will not fill up completely, or exploding and overflow; and that the filter will not run dry, thus removing the embryos from the medium and exposing them to a potentially hostile environment.

Another inconvenience of this filter is that the localization, manipulation and embryonic evaluation cannot be solely done within the device, therefore what is required are other steps and devices in the process of collection and evaluation once the uterine wash has been completed. Specifically, the filter is drained until all that remains is approximately 1/5 of its volume. It is then shaken forming a whirl that it able to remove most of the embryos from the filter device. The medium is then poured into a petri dish, the filtration net must be washed immediately with a syringe full of the collection medium utilizing a needle of a small caliber (less than 18 gauge). This is in order to loosen as much of the uterine mucus and entrapped embryos as possible. With this method there is a risk of causing physical damage to the embryo by the trauma they suffer while being agitated and poured into the petri dish and also being hit by the stream of medium under pressure. This risk is eliminated by using the device of the present invention.

Furthermore, the localization and evaluation of the embryo in the conventional petri dish is more tedious than with the improved device of the present invention. In addition to having a large surface area for searching, the petri dish has vertical walls, which make it difficult to find embryos stuck to them, because the walls reduce the visibility in the perimeter of the petri dish, this is not the case with the improved device of the present invention.

There are other designs of filters on the market that differ only in their capacity of volume. These filters are self-draining because they have in the center a plastic tower that rises from its base to continue to the top of the device in a net of filtration. But such filters act the same as the filter with its filtration net at the bottom, receiving in cascade the collected medium. The mucus and the embryos easily slide towards the filtration net. Once the collected medium has all passed, it is necessary to let the medium settle for several seconds, then the remaining liquid in the filter is sucked up with a syringe down below the inferior level of the net. The removal of the liquid is necessary to prevent (continued leakage from) the filter choice as it is moved and the glass base of the microscope getting wet with interruption of visibility. This is another of the differences that exist in the collection and evaluation of embryos using the improved device.

SUMMARY OF THE INVENTION

The present invention provides a device for the collection and evaluation of embryo having several advantages in comparison to the other existing devices. These include: the possibility of trapping the embryo in the net of filtration is minimized; embryonic trauma is minimized; and observation and evaluation of the embryo is facilitated.

The device of the present invention also improves upon existing devices in several ways. First, it improves the device by the inclusion of a main system of filtration and the upper lateral drainage. Second, it improves the device by a design which eliminates foaming of the collected medium. Third, it improves the device by the inclusion of a embryo observation chamber. Fourth, it improves the device by the inclusion of a system of filtration and a lower lateral drainage. Fifth, it improves the device by the inclusion of a lateral drainage controlled automatically. Sixth, it improves the device by the inclusion of a light projection chamber that concentrates the light emitted by the microscope. Seventh, it improves the device by using the lateral walls with a slope which facilitates the localization and evaluation of the embryo.

The sloped walls of the present invention force the embryos to roll down to the bottom of the container and in case any of them remain in a vertex of the chamber of observation of the embryo, they could be easily be found. This area is illuminated properly because of the light projection characteristics of the chamber.

Unlike current self draining filters, the new device of the present invention has a secondary net of filtration and a lateral lower drainage that facilitates removal of excess fluid from the device prior to searching. Also, in contrast to known filters, the filter of the present invention has a grid base to facilitate a systematic embryo search. In contrast, the search filter currently on the market presents the same problem as the vertical walls in the petri dish, but even more pronounced. This makes it difficult to search, either in the exterior wall of the device or in the internal one that makes the tower of filtration.

DETAILED DESCRIPTION

The improved embryo recollection and evaluation device of the present invention will now be described with reference to FIGS. 1-6.

Figure 1:
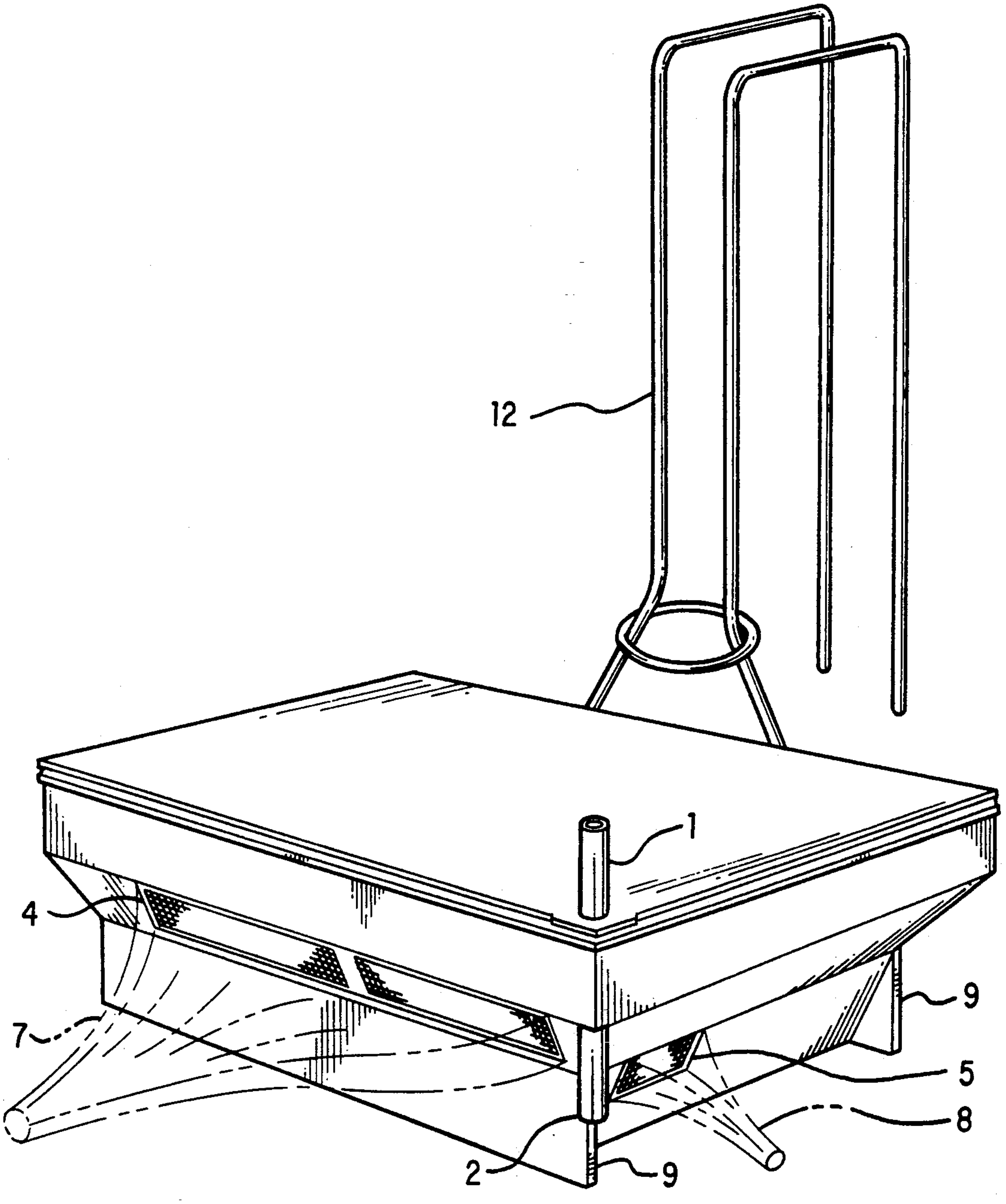
FIG. 1 is a perspective view of the device of the present invention and a holder.

As shown in FIG. 1, the device of the present invention is in the form of a tray or receptacle adapted to be held by a holder 12 such as that shown in FIG. 1. The top of the filter tray is covered by a plastic filter 10 which has an admission valve or an entrance valve 1 connected thereto as best shown in FIG. 2.

Figure 4:
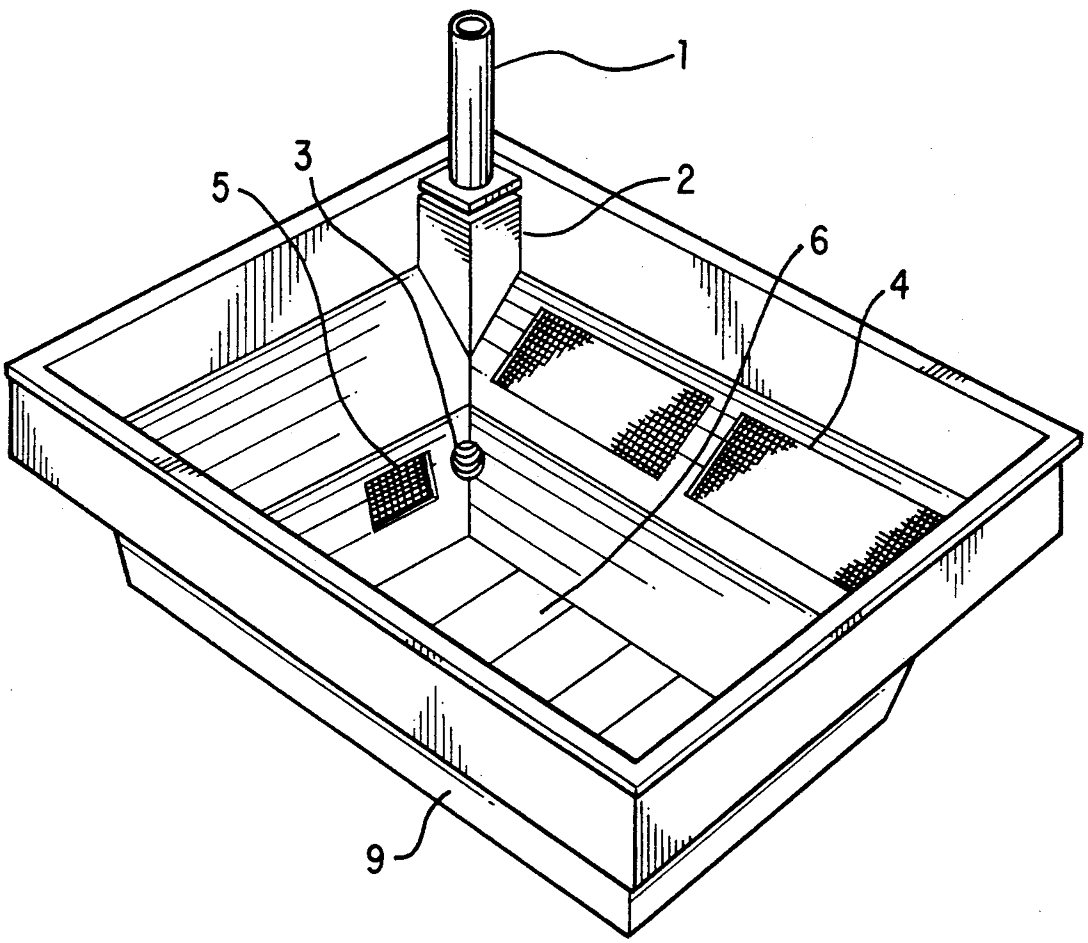
FIG. 4 is a perspective view of a portion of the device of FIG. 1.
Figure 5:
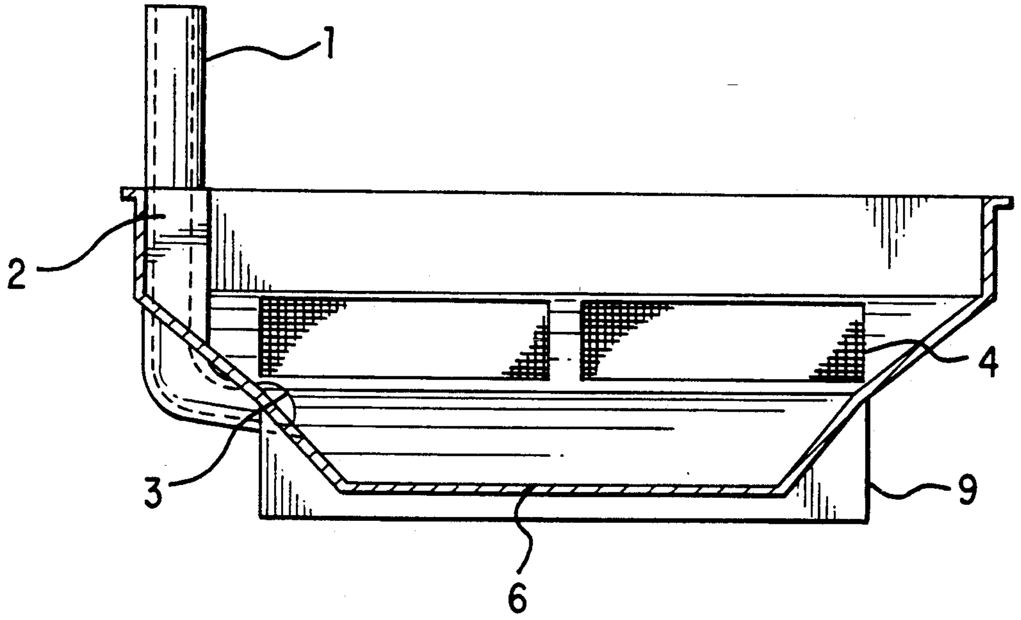
FIG. 5 is a front view of the device of FIG. 1.
Figure 6:
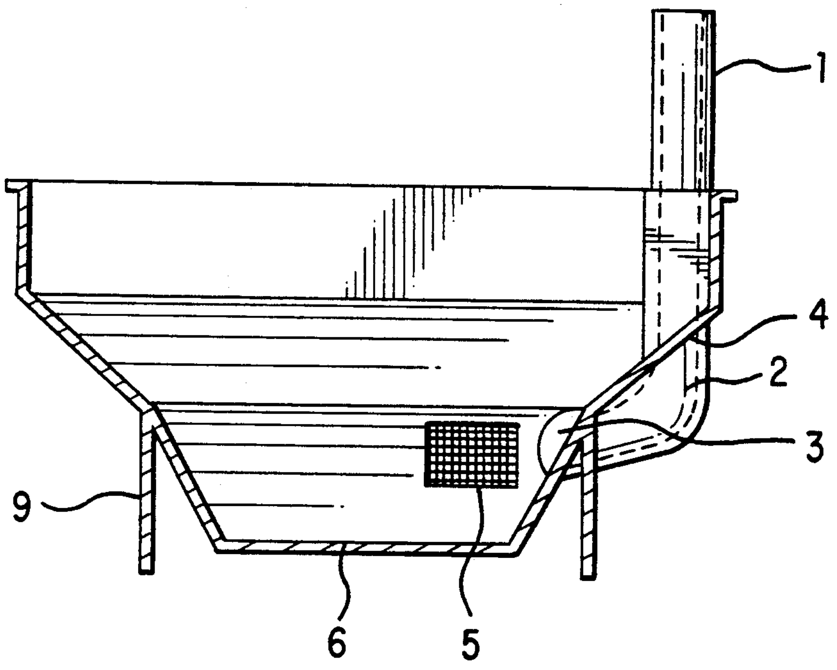
FIG. 6 is a side view of the device of FIG. 1.

As best shown in FIG. 4, the admission valve 1 leads to an interface 11 with a spillway or discharge tube 2. The path of the discharge tube 2 is best shown in FIGS. 5 and 6. As shown therein, the tube extends from the interface with the mission valve 1 to a corner of the tray discharges at a discharge tube 3 provided in the corner of the tray. The provision of the discharge tube in the corner is such that the collected medium flows against the opposite corner precisely where there is no filtration net. This ensures that the mucus in the embryo settled to the bottom of the embryo observation chamber 6 and not into the main filtration net and upper lateral drainage filter 4.

Figure 2:
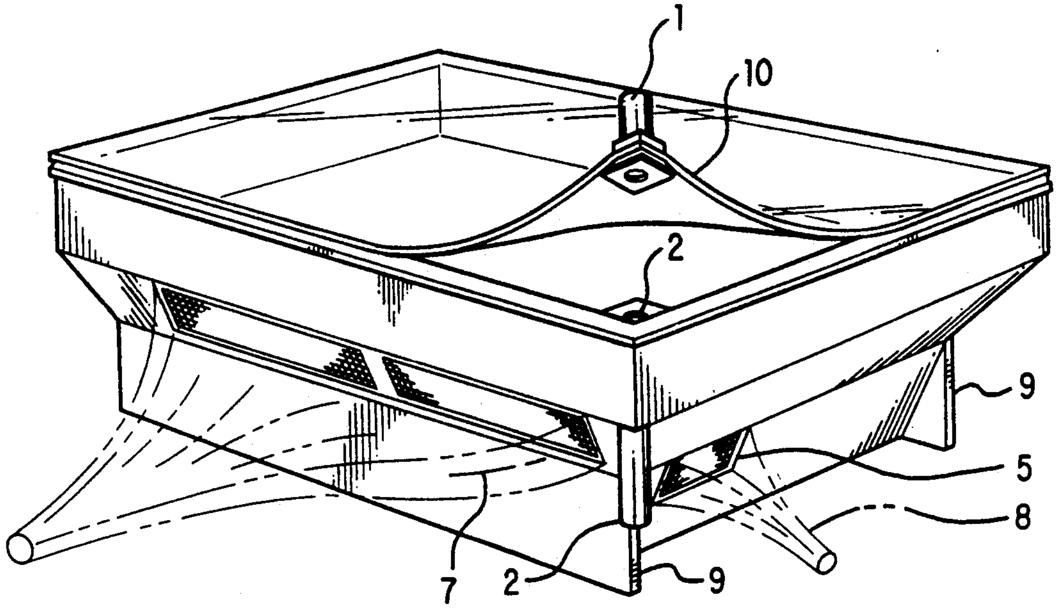
FIG. 2 is a perspective view of the device of FIG. 1 with a corner of the plastic cover lifted away.
Figure 3:
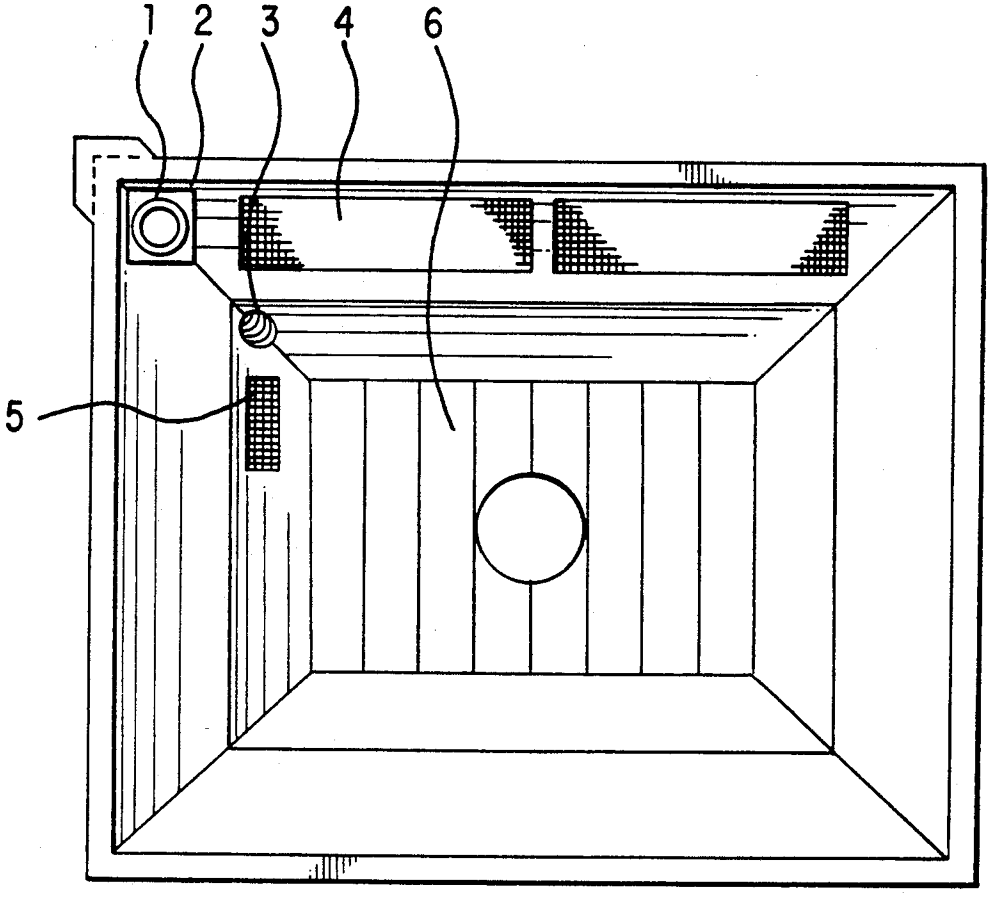
FIG. 3 is a top view of the device of FIG. 1 with the cover removed.

As best shown in FIGS. 2 and 3, the device further includes a main filtration net and upper lateral drainage filter 4 formed on sloped side walls of the device. A fluid tight discharge funnel 7 is connected to the exit side of the main filtration net and upper lateral drainage filter 4 such that the fluid passing through the filter 4 is funneled by the discharge funnel 7. As explained below, the end of the discharge funnel 7 can be cut at an appropriate time to cause drainage of the filtered fluid medium at an appropriate time. The device further includes a secondary filtration net and a lower lateral drainage filter 5 located on another sloped side wall of the device.

As shown in the drawings, particularly FIG. 6, the secondary filtration net is located below the main filtration net. The secondary filtration net also includes a secondary discharge funnel 8 connected to the outside of the secondary filter 5. Like the first discharge funnel 7, the secondary funnel 8 can be cut at an appropriate time to facilitate drainage through the secondary filter.

Embryo observation chamber 6 is formed on the bottom of the tray-like device. As shown in FIG. 3, the bottom surface of the embryo observation chamber 6 is formed with a grid pattern to facilitate localization of the embryo.

The device also includes a light projection chamber 9 which concentrates the light emitted by a microscope in the area of the embryo observation chamber 6 to better illuminate the embryo observation chamber.

The improved device for the collection and evaluation of the embryo of the bovine and other animal species is useful to anyone wishing to practice the technology of embryo transfer in connection with the method described hereinafter.

The procedure begins with the uterine flush of the donating cow. This cow has been previously injected with F. S. H. plus an application of prostaglandin that induces heat or estrus in the cow, hopefully producing a superovulation.

At this point the ovum are released to be fertilized by artificial insemination, or natural breeding. The embryonic maturation then starts inside the uterus where the embryos remains for 7 to 10 days maximum. Solution is introduced through the vagina into the body of the uterus by gravity flow through a hose connected to a Foley's catheter, previously placed by the technician. The end of the discharge funnel 7 must be cut in order to fill the device with collected medium, up to the highest level of the discharge tube 3. As the uterus is filled and gradually becomes distended with medium, smooth movements of the hand positioned in the rectum, cause embryos to be suspended in collection medium. This collection medium then flows through the foley catheter of connected tubing, into the device of the present invention.

The collected medium is deposited near the bottom of the improved device through a spillway or discharge tube 2. In this system, the collected medium with the embryos enters the filter device without increasing the pressure of collision. This is due to the fact that, as shown in FIG. 2, the filter's exit or discharge tube 2 has a bigger diameter than that of the interior valve of admission, this causes the collected medium to slide slowly to the bottom without forming any foam. Foam makes the embryo, in extreme cases, difficult or impossible to locate under the microscope. When the uterine mucus is stuck to the foam, it increases the work, time and fatigue for the observant. In the device of the present invention, the discharge tube is positioned in such a way that the collected medium flows against the opposite corner, precisely where there is no filtration net. This helps the mucus and the embryo settle to the bottom of the embryo observation chamber 6 and not into the main filtration net and upper lateral drainage filter 4. In this way the device is gradually filled up, and when it reaches the level of the upper lateral net it automatically pours the collected medium without having any pressure of dragging, capable of taking the mucus or the embryo to the net mentioned.

Once the collected medium has been filtered and drained by the upper lateral net, the remainder of the collected medium is allowed to settle for approximately one minute in the device which is horizontally positioned with a holder 12 adaptable to any type of structure. These connections are made before cutting the edge of the secondary funnel 8 that spill the collected medium coming from the secondary net of the filtration and the lateral lower drainage filter 5.

As the filtering and drainage proceed, the collected medium is concentrated in the embryo observation chamber, that is characterized as having a small area for embryonic localization and evaluation. This area is gridded and has its lateral walls designed with an incline slope, so that the embryo can always roll down to the bottom of the device, therefore making the search for embryos under the microscope faster than with currently available devices. The plastic filter cover 10 is removed by sliding it away from the flap of the device.

The filter is then left under the microscope for the embryonic localization, manipulation and evaluation. These steps can easily take place due to the provision of a light projection chamber 9 in the device, which concentrates the light emitted by the microscope in the area of the embryo observation chamber. And thus illuminating well and creating an easier task for the technician using the microscope. The union or interface 11 between the discharge tube 2 and the admission valve 1 is found as a signal.

It is emphasized especially that with this filter the embryos fall as softly as possible to the bottom of the chamber of observation. Therefore the percentage of conceptions and successful pregnancies can be increased due to reduced trauma to the embryo.

The device with the describe elements presented, avoids the embryo falling all of a sudden in a cascade, which commonly happens in the collection filters that are currently used on the international market.

The improved device eliminates the need to have to shake the medium in order to pour it from the filter, into a petri dish with the accompanying turbulence, collisions and trauma. Also searching is done in the filter device more efficiently than in any filter currently marketed.

I claim:

1. A device for filtering a medium containing an embryo to allow collection and evaluation of the embryo, the device comprising: a fluid container having first and second ends connected to one another by a side wall portion, the first end comprising a flat bottom wall which, together with the side wall portion forms a fluid reservoir, the second end comprising an opening through which fluid passes into the reservoir formed by the side wall portion and the first end, the side wall portion comprising at least one sloped side wall, a first filtered drainage opening formed in a sloped side wall of the side wall portion, the first filtered drainage opening comprising an opening in the side wall and a mesh filter covering the opening, the mesh filter allowing fluid to pass through the opening, but preventing the embryo from passing through the opening, a first discharge funnel surrounding the first filtered drainage opening to collect any fluid passing through the first drainage opening, the first drainage funnel being adapted to be opened to allow drainage of collected fluid; a second filtered drainage opening formed in a sloped side wall of the side wall portion at a location closer to the flat bottom wall than the first filtered drainage opening, the second filtered drainage opening comprising an opening in the side wall and a mesh filter covering the opening, the mesh filter allowing fluid to pass through the opening, but preventing the embryo from passing through; a second discharge funnel surrounding the second filtered drainage opening to collect any fluid passing through the second drainage opening, the second drainage funnel being adapted to be opened to allow drainage of collected fluid.

2. The device of claim 1, wherein the flat bottom wall of the first end is transparent to allow observation of the embryo.

3. The device of claim 1, further comprising a light projection chamber surrounding the flat bottom wall for concentrating light on the bottom wall.

4. The device of claim 1, wherein the bottom wall includes a grid to facilitate location of the embryo.

5. The device of claim 1, further comprising a removable lid for covering the second end of the device, the lid including an admission valve for allowing fluid to pass through the lid into the reservoir, the admission valve having an intake end and a discharge end.

6. The device of claim 5, further comprising a discharge tube having first and second ends, the first end of the discharge tube located proximate the discharge end of the admission valve and the second end of the discharge tube opening into the side wall portion such that the discharge tube receives fluid medium passing through the admission valve and discharges said medium into the reservoir.

7. The device of claim 6, wherein the second end of the discharge tube opens into the side wall portion at a location such that fluid discharged from the discharge tube flows away from the first and second filtered drainage openings.

8. The device of claim 6, wherein the discharge end of the admission valve has a predetermined opening diameter, and the first end of the discharge tube has a predetermined opening diameter and wherein the opening diameter of the first end of the discharge tube is larger than the opening diameter of the discharge end of the admission valve so that fluid medium can passes smoothly from the admission valve to the discharge tube.

9. A device for filtering a fluid medium containing an embryo to allow collection and evaluation of the embryo, the device comprising:

an open receptacle having a flat transparent bottom wall and a plurality of sloped side walls extending from the bottom wall toward an open end of the receptacle;

a lid covering the open end of receptacle, the lid including an admission valve for allowing the fluid medium to pass through the lid into the receptacle;

first filter means formed on one of the sloped side walls for selectively filtering and draining a first portion of fluid contained within the receptacle while leaving another portion of the fluid in the receptacle; and a second filter means formed on one of the sloped side walls for selectively filtering and draining a portion of the fluid remaining in the receptacle after the first filter means has drained the first portion of the fluid from the receptacle, whereby the embryo is confined to the proximity of the transparent bottom wall for observation and evaluation.

10. The device of claim 9, wherein the first filter means comprises:

a first filtered drainage opening comprising an opening formed in the side wall and a mesh filter covering the opening, the mesh filter allowing fluid to pass through the opening, but preventing the embryo from passing through the opening, a first discharge funnel surrounding the first filtered drainage opening to collect any fluid passing through the first drainage opening, the first drainage funnel being adapted to be opened to allow drainage of collected fluid; and the second filter means comprising a second filtered drainage opening formed at a location closer to the bottom wall than the first filtered drainage opening, the second filtered drainage opening comprising an opening in the side wall and a mesh filter covering the opening, the mesh filter allowing fluid to pass through the opening, but preventing the embryo from passing through, a second discharge funnel surrounding the second filtered drainage opening to collect any fluid passing through the second drainage opening, the second drainage funnel being adapted to be opened to allow drainage of collected fluid.

11. The device of claim 9, further comprising a light projection chamber surrounding the flat bottom wall to concentrate light on the bottom wall.

12. The device of claim 9, wherein the bottom wall includes a grid to facilitate location of the embryo.

13. The device of claim 9, further comprising a discharge tube having first and second ends, the first end of the discharge tube located proximate the discharge end of the admission valve and the second end of the discharge tube opening into the receptacle such that the discharge tube receives fluid medium passing through the admission valve and discharges said medium into the receptacle.

14. The device of claim 13, wherein the second end of the discharge tube opens into the receptacle at a location such that fluid discharged from the discharge tube flows away from the first and second filter means.

15. The device of claim 13, wherein the discharge end of the admission valve has a predetermined opening diameter, and the first end of the discharge tube has a predetermined opening diameter and wherein the opening diameter of the first end of the discharge tube is larger than the opening diameter of the discharge end of the admission valve so that fluid medium can pass smoothly from the admission valve to the discharge tube.

16. A method for filtering a fluid medium containing an embryo to allow collection and evaluation of the embryo, the method comprising the steps of:

collecting the fluid medium in a receptacle having a transparent bottom wall and sloped side walls;

draining an upper portion of the fluid medium from the receptacle through a first filter mesh located in a sloped side wall so that anything retained by the first filter mesh is gently transported to the lower portion of the receptacle;

draining a portion of the remaining fluid medium through a second filter mesh formed in a sloped side wall and located closer to the flat bottom wall than the first filter mesh so as to further reduce the volume of fluid medium in the receptacle such that the remaining fluid medium and anything retained by the second filter mesh is concentrated in the proximity of the flat bottom wall.

17. The method of claim 16, wherein the step of collecting the fluid medium in a receptacle includes the step of discharging the fluid medium into the receptacle in a direction away from the filter meshes.

* * * * *